United States Patent
Fujii et al.

(10) Patent No.: US 7,572,538 B2
(45) Date of Patent: Aug. 11, 2009

(54) FUEL CELL

(75) Inventors: Yosuke Fujii, Tochigi-ken (JP); Seiji Sugiura, Utsunomiya (JP); Narutoshi Sugita, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 511 days.

(21) Appl. No.: 10/656,481

(22) Filed: Sep. 4, 2003

(65) Prior Publication Data

US 2004/0121215 A1 Jun. 24, 2004

(30) Foreign Application Priority Data

Sep. 4, 2002 (JP) .............. 2002-259217

(51) Int. Cl.
- H01M 2/08 (2006.01)
- H01M 4/94 (2006.01)
- H01M 8/02 (2006.01)

(52) U.S. Cl. .............. 429/35; 429/38; 429/44
(58) Field of Classification Search ........... None
See application file for complete search history.

(56) References Cited

U.S. PATENT DOCUMENTS

| | | | | |
|---|---|---|---|---|
| 5,464,700 A | * | 11/1995 | Steck et al. | 429/30 |
| 5,912,088 A | * | 6/1999 | Ernst | 429/35 |
| 7,049,023 B2 | | 5/2006 | Fujii et al. | |
| 2001/0044042 A1 | | 11/2001 | Inoue et al. | |
| 2001/0051294 A1 | * | 12/2001 | Inoue et al. | 429/35 |
| 2002/0119358 A1 | * | 8/2002 | Rock | 429/32 |
| 2003/0003342 A1 | * | 1/2003 | Sugita et al. | 429/35 |

FOREIGN PATENT DOCUMENTS

| | | |
|---|---|---|
| CA | 2102695 | 12/1992 |
| EP | 0951086 A2 | 10/1999 |
| EP | 1235289 A2 | 8/2002 |
| EP | 1289042 A2 | 3/2003 |
| JP | 11-354142 | 12/1999 |
| JP | 2002-25587 | 1/2002 |
| JP | 2002-124275 | 4/2002 |
| WO | WO-92/22096 A2 | 12/1992 |

OTHER PUBLICATIONS

Japanese Office Action for Application No. 2002-259217, dated Jun. 27, 2006.
European Search Report for Application No. 03255521.1—2119, dated Sep. 21, 2006.

* cited by examiner

Primary Examiner—Robert Hodge
(74) Attorney, Agent, or Firm—Lahive & Cockfield, LLP; Anthony A. Laurentano

(57) ABSTRACT

A fuel cell includes a membrane electrode assembly and first and second metal separators for sandwiching the membrane electrode assembly. In the membrane electrode assembly, a surface area of a gas diffusion layer is larger than a surface area of a gas diffusion layer. A seal member is provided at a position corresponding to an outer marginal region of the gas diffusion layer. The seal member includes a main seal inserted between a solid polymer electrolyte membrane and the first metal separator, and an a flow field wall inserted between the gas diffusion layer and the first metal separator for defining a part of an oxygen-containing gas flow field.

4 Claims, 7 Drawing Sheets

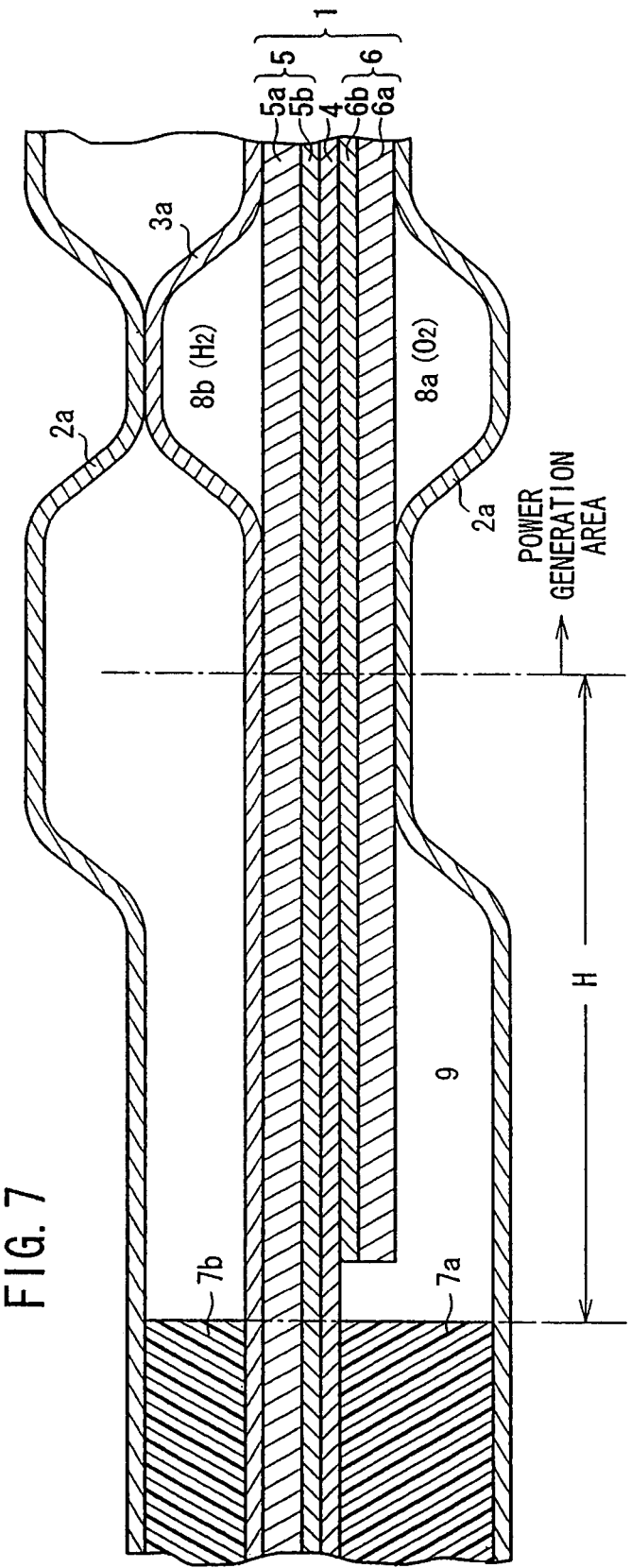

FUEL CELL

BACKGROUND OF THE INVENTION

1. Field of the Invention

The present invention relates to fuel cell including an electrolyte electrode assembly interposed between a pair of separators. The electrolyte electrode assembly includes a pair of electrodes, and an electrolyte interposed between the electrodes.

2. Description of the Related Art

For example, a solid polymer electrolyte fuel cell employs a membrane electrode assembly (MEA) which comprises two electrodes (anode and cathode) and an electrolyte membrane interposed between the electrodes. The electrolyte membrane is a polymer ion exchange membrane. The membrane electrode assembly is interposed between separators. The membrane electrode assembly and the separators make up a unit of the fuel cell for generating electricity. A predetermined number of fuel cells are stacked together to form a fuel cell stack.

In the fuel cell, a fuel gas such as a hydrogen-containing gas is supplied to the anode. The catalyst of the anode induces a chemical reaction of the fuel gas to split the hydrogen molecule into hydrogen ions (protons) and electrons. The hydrogen ions move toward the cathode through the electrolyte, and the electrons flow through an external circuit to the cathode, creating a DC electric current. An oxygen-containing gas or air is supplied to the cathode. At the cathode, the hydrogen ions from the anode combine with the electrons and oxygen to produce water.

In the fuel cell, it is desirable to improve the sealing characteristics of the membrane electrode assembly and the separators. For example, Japanese laid-open patent publication No. 2002-25587 discloses a fuel cell directed to improve the sealing characteristics. As shown in FIG. 6, the fuel cell includes a membrane electrode assembly 1, and first and second separators 2, 3. The membrane electrode assembly 1 includes an anode 5, and a cathode 6, and a solid polymer electrolyte membrane 4 interposed between the anode 5 and the cathode 6. The surface area of the anode 5 is larger than the surface area of the cathode 6. A first seal 7a is provided around the cathode 6 on the inner surface side of the second separator 3. The first seal 7a is in contact with the solid polymer electrolyte membrane 4. Further, a second seal 7b is provided around the first seal 7a between the first and second separators 2, 3.

Typically, the first and second separators 2, 3, are made of material chiefly containing carbon. However, the mechanical strength of the carbon material is not high. The carbon material is not suitable for producing thin separators. In recent years, metal plates are used for producing the separators. The strength of the separators in the form of metal plates is high in comparison with the strength of the separators made of carbon material. Therefore, the metal plates are suitable for producing the thin separators. Desirable shapes of reactant gas flow fields can be formed in the metal separators by press forming. Thus, the overall size and weight of the fuel cell are reduced.

FIG. 7 is a view showing a possible structure of a fuel cell using the metal separators. In the fuel cell, a membrane electrode assembly 1 is interposed between first and second metal separators 2a, 3a. An oxygen-containing gas flow field 8a is formed on the first metal separator 2a for supplying an oxygen-containing gas to a cathode 6. A fuel gas flow field 8b is formed on the second metal separator 3a for supplying a fuel gas to an anode 5.

Each of the anode 5 and the cathode 6 has a gas diffusion layer 5a, 6a such as a porous carbon paper, and an electrode catalyst layer 5b, 6b of platinum alloy supported on porous carbon particles. The carbon particles are deposited uniformly on the surface of the gas diffusion layer 5a, 6a.

However, in the structure, a space 9 is defined by a first seal 7a, the first separator 2a, and the cathode 6. The space 9 is not utilized for power generation. However, the oxygen-containing gas flows through the space 9, and thus, the oxygen-containing gas is not supplied to the electrode surface efficiently. Consequently, the power generation performance of the fuel cell is lowered.

The distance H from the first seal 7a to the power generation area (the area of the fuel cell actually utilized for power generation) is relatively large. The percentage of the surface area used for power generation in the entire surface is reduced. Thus, the overall size of the fuel cell needs to be large for maintaining the desired power generation performance.

SUMMARY OF THE INVENTION

A general object of the present invention is to provide a fuel cell with a simple and compact structure in which reactant gases do not leak from reactant gas flow fields, and the desired power generation performance is maintained.

According to the present invention, an electrolyte electrode assembly includes a pair of electrodes and an electrolyte interposed between the electrodes. The electrolyte electrode assembly is sandwiched between a pair of metal separators. The electrodes include respective gas diffusion layers and respective electrode catalyst layers facing the electrolyte. A surface area of one of the gas diffusion layers is larger than a surface area of the other of the gas diffusion layers. One gas diffusion layer includes an outer marginal region extending outwardly beyond an outer region of the other gas diffusion layer. A seal member is interposed between the outer marginal region and the metal separator.

The seal member includes a flow field wall inserted between the outer region of the other gas diffusion layer and the metal separator. The flow field wall defines a part of the reactant gas flow field. The seal member is in contact with the electrolyte and the gas diffusion layer. The contact area extends continuously from the electrolyte to the gas diffusion layer. Thus, leakage of the reactant gas from the gas diffusion layer is prevented reliably.

The seal member itself forms a part of the reactant gas flow field. Therefore, the space which is not utilized for power generation is not formed between the seal member and the metal separator. Since the oxygen-containing gas does not flow into the space which is not utilized for power generation, the reactant gas can be used efficiently. Thus, the power generation performance of the fuel cell is greatly improved.

Preferably, the reactant gas flow field is a serpentine flow passage having at least one turn region. The seal member includes a partition seal in contact with the metal separator and the gas diffusion layer. The partition seal extends into the turn region of the reactant gas flow field to form the serpentine flow passage. The serpentine flow passage comprises grooves sealed air-tight. The reactant gas flows through the grooves along both sides of the partition seal in opposite directions.

Therefore, in the turn region in which a pressure difference of the reactant gas may exist, shortcuts of the reactant gas are effectively prevented. The leakage of the reactant gas is reliably prevented, and the reactant gas is uniformly supplied to the power generation surface of the fuel cell. Thus, the desired power generation performance of the fuel cell is reliably maintained.

The above and other objects. features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 is a cross sectional view showing main components of another fuel cell.

DESCRIPTION OF THE PREFERRED EMBODIMENTS

Figure 1:
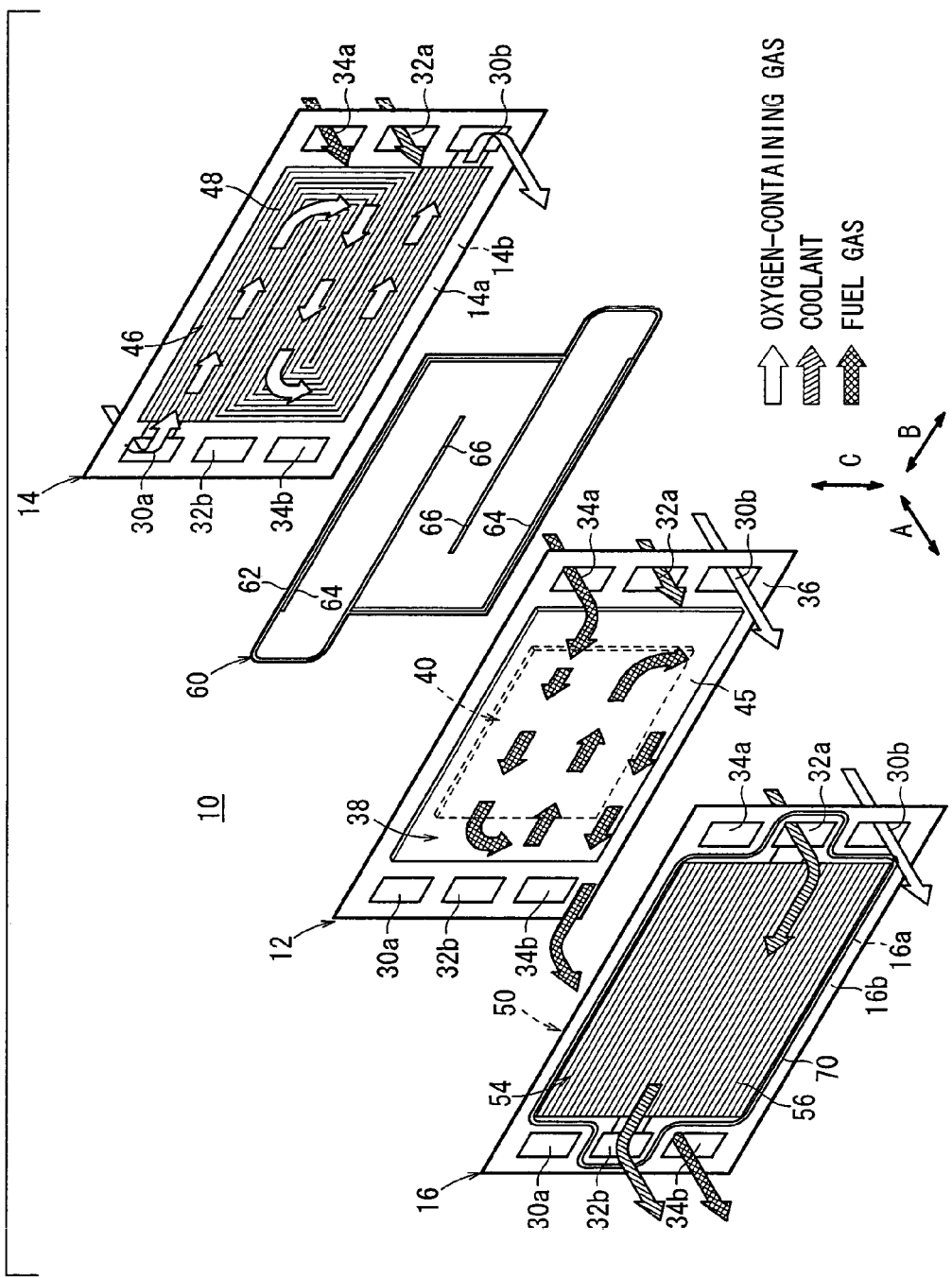
FIG. 1 is an exploded perspective view showing main components of a fuel cell according to an embodiment of the present invention.
Figure 2:
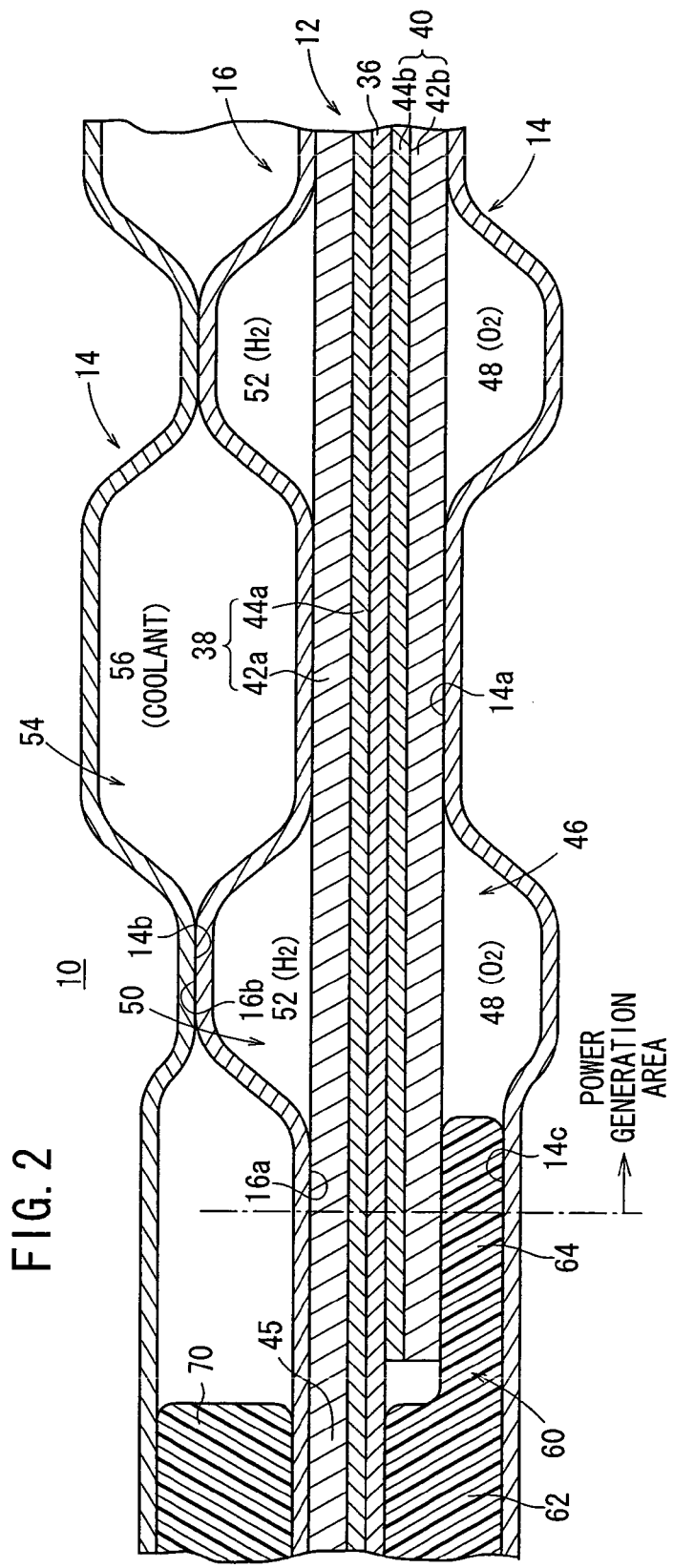
FIG. 2 is a cross sectional view showing main components of the fuel cell.

FIG. 1 is an exploded perspective view showing main components of a fuel cell 10 according to an embodiment of the present invention. FIG. 2 is a cross sectional view showing main components of the fuel cell 10.

The fuel cell 10 includes a membrane electrode assembly (electrolyte electrode assembly) 12, and first and second metal separators 14, 16 for sandwiching the membrane electrode assembly 12. As shown in FIG. 1, at one end of the fuel cell 10 in a horizontal direction indicated by an arrow B, an oxygen-containing gas supply passage 30a for supplying an oxygen-containing gas, a coolant discharge passage 32b for discharging a coolant, and a fuel gas discharge passage 34b for discharging a fuel gas such as a hydrogen-containing gas are arranged in a vertical direction indicated by an arrow C. The oxygen-containing gas supply passage 30a, the coolant discharge passage 32b, and the fuel gas discharge passage 34b extend through the fuel cell 10 in a stacking direction indicated by an arrow A.

At the other end of the fuel cell 10 in the direction indicated by the arrow B, a fuel gas supply passage 34a for supplying the fuel gas, a coolant supply passage 32a for supplying a coolant, and an oxygen-containing gas discharge passage 30b for discharging the oxygen-containing gas are arranged in the direction indicated by the arrow C. The fuel gas supply passage 34a, the coolant supply passage 32a and the oxygen-containing gas discharge passage 30b extend through the fuel cell 10 in the direction indicated by the arrow A.

The membrane electrode assembly 12 comprises an anode 38, a cathode 40, and a solid polymer electrolyte membrane 36 interposed between the anode 38 and the cathode 40. The solid polymer electrolyte membrane 36 is formed by impregnating a thin membrane of perfluorosulfonic acid with water, for example.

As shown in FIG. 2, each of the anode 38 and the cathode 40 has a gas diffusion layer (porous diffusion member) 42a, 42b, and an electrode catalyst layer 44a, 44b of platinum alloy supported on porous carbon particles. The carbon particles of the electrode catalyst layer 44a, 44b are deposited uniformly on the surface of the gas diffusion layer 42a, 42b. The electrode catalyst layer 44a of the anode 38 and the electrode catalyst layer 44b of the cathode 40 are fixed to both surfaces of the solid polymer electrolyte membrane 36, respectively.

The surface area of the anode 38 is larger than the surface area of the cathode 40. The gas diffusion layer 42a of the anode 38 includes an outer marginal region 45 extending outwardly beyond an outer region of the gas diffusion layer 42b of the cathode 40.

Figure 3:
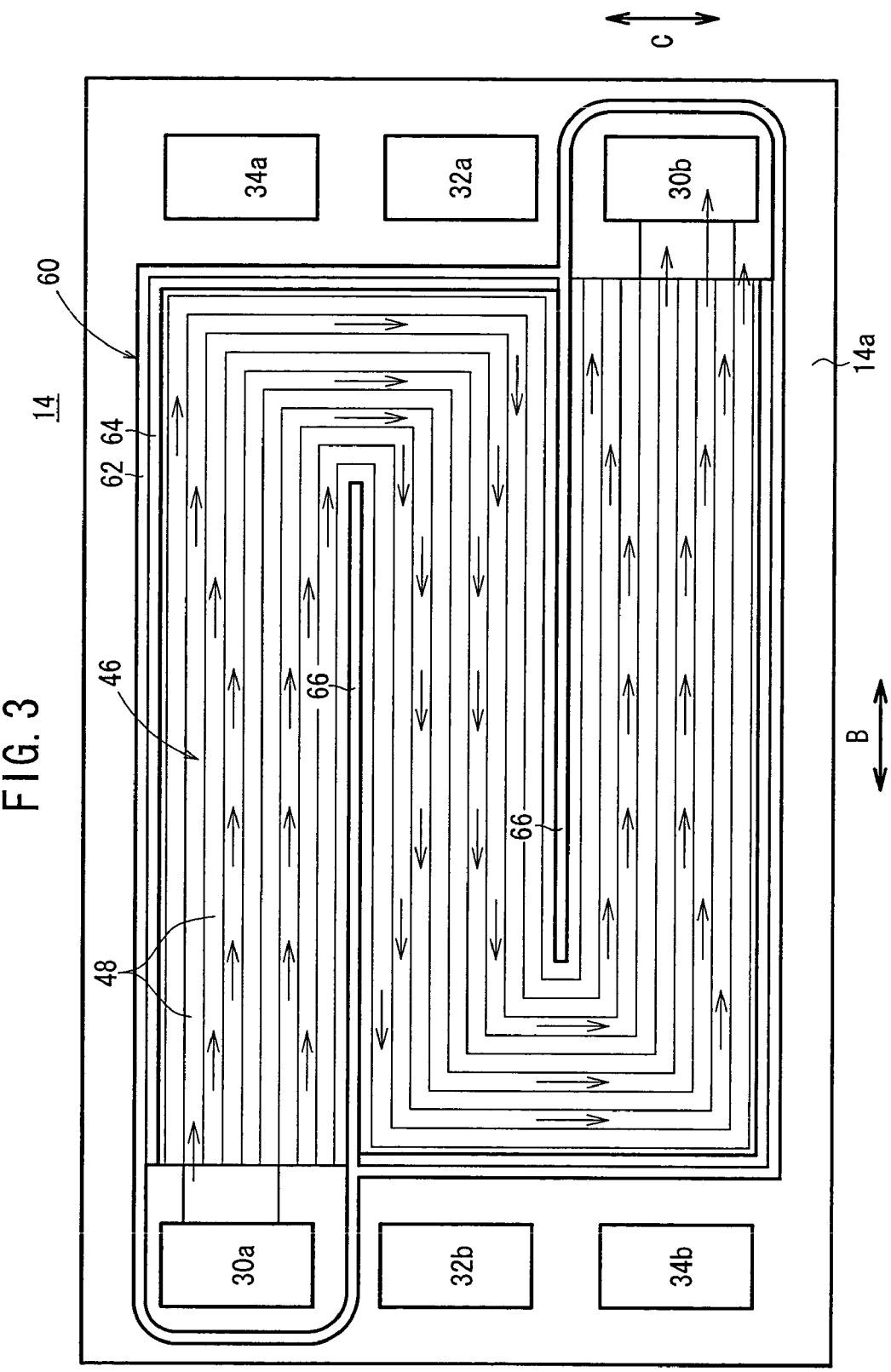
FIG. 3 is a front view showing a first metal separator of the fuel cell.

As shown in FIG. 1, the first metal separator 14 has a serpentine oxygen-containing gas flow passage (reactant gas flow field) 46 on its surface 14a facing the membrane electrode assembly 12. As shown in FIG. 3, the serpentine oxygen-containing flow passage 46 comprises a plurality of oxygen-containing gas grooves 48 extending in a serpentine pattern including two U-turn regions for allowing the oxygen-containing gas to flow horizontally back and forth in the direction indicated by the arrow B. and vertically in the direction indicated by the arrow C. The serpentine oxygen-containing gas flow passage 46 is connected to the oxygen-containing gas supply passage 30a at one end, and connected to the oxygen-containing gas discharge passage 30b at the other end.

Figure 4:
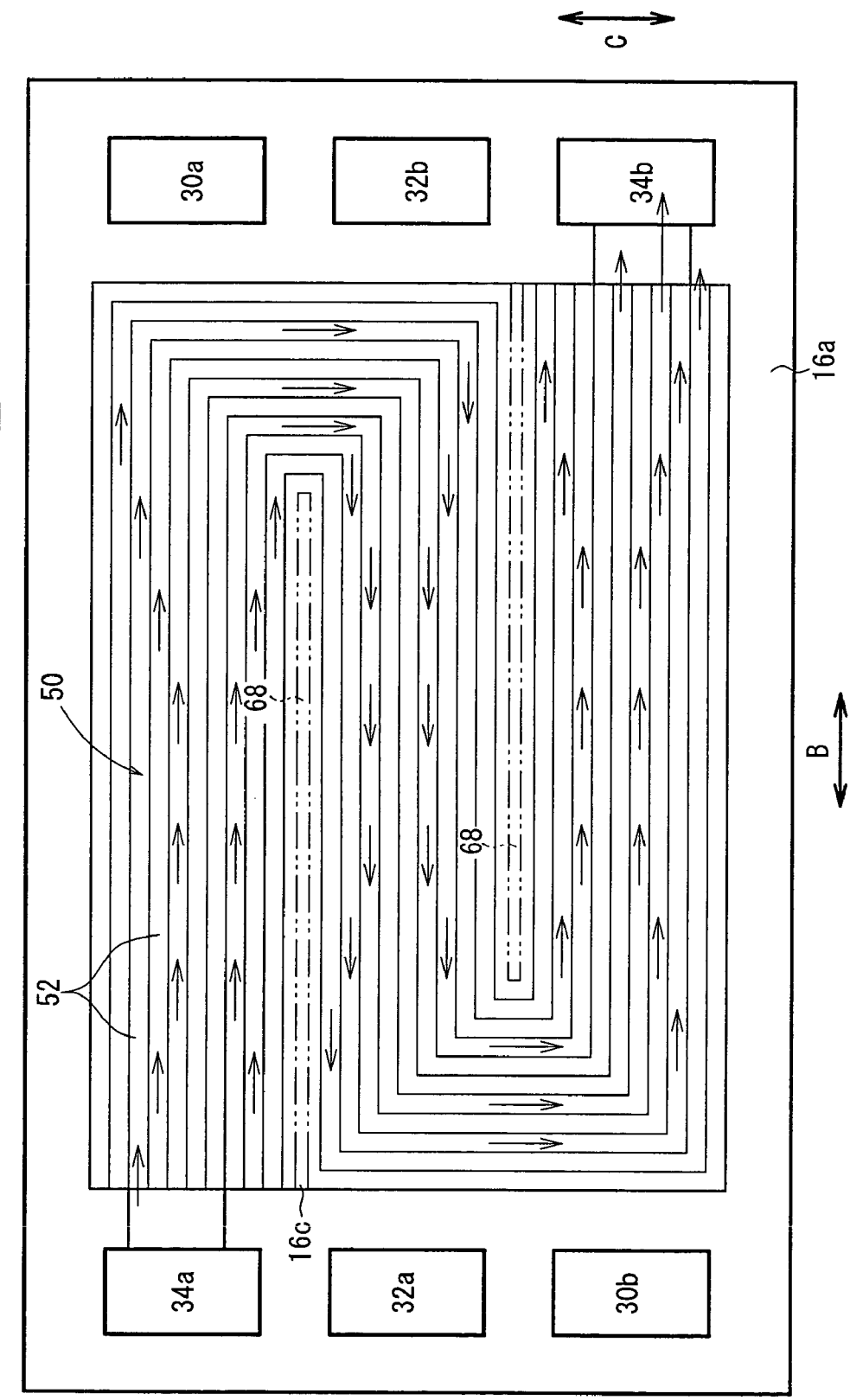
FIG. 4 is a front view showing a second metal separator of the fuel cell.

As shown in FIG. 4, the second metal separator 16 has a serpentine fuel gas flow passage (reactant gas flow field) 50 on it surface 16a facing the membrane electrode assembly 12. The serpentine fuel gas flow passage 50 comprises a plurality of fuel gas grooves 52 extending in a serpentine pattern for allowing the fuel gas to flow horizontally back and forth, and vertically. The serpentine fuel gas flow passage 50 is connected to the fuel gas supply passage 34a at one end, and connected to the fuel gas discharge passage 34b at the other end.

As shown in FIGS. 1 and 2, a coolant flow passage 54 is formed between a surface 14b of the first metal separator 14 and a surface 16b of the second metal separator 16. The coolant flow passage 54 comprises a plurality of coolant grooves 56 extending in the direction indicated by the arrow B. The coolant flow passage 54 is connected to the coolant supply passage 32a at one end, and connected to the coolant discharge passage 32b at the other end.

As shown in FIG. 2, a seal member 60 is provided on a flat surface 14c of the first metal separator 14. The seal member 60 may be attached to the flat surface 14c by heat. While surface 14a of the first metal separator 14 is in contact with the cathode 40, the flat surface 14c of the first metal separator 14 is spaced from the cathode 40 by a predetermined distance. The seal member 60 includes a main seal 62 interposed between the solid polymer electrolyte membrane 36 and the flat surface 14c of the first metal separator 14, corresponding to a position of the outer marginal region 45 of the gas diffusion layer 42a of the anode 38. Further, the seal member 60 includes a flow field wall 64 interposed between the outer region of the gas diffusion layer 42b and the flat surface 14c of the first metal separator 14.

The main seal 62 is formed around an outer region of the solid polymer electrolyte membrane 36, the oxygen-containing gas supply passage 30a, and the oxygen-containing gas discharge passage 30b. The flow field wall 64 is thinner than the main seal 62, and formed around the outer region of the gas diffusion layer 42b. As shown in FIG. 2, the flow field wall 64 defines a part of the oxygen-containing gas groove 48 of the first metal separator 14.

Figure 5:
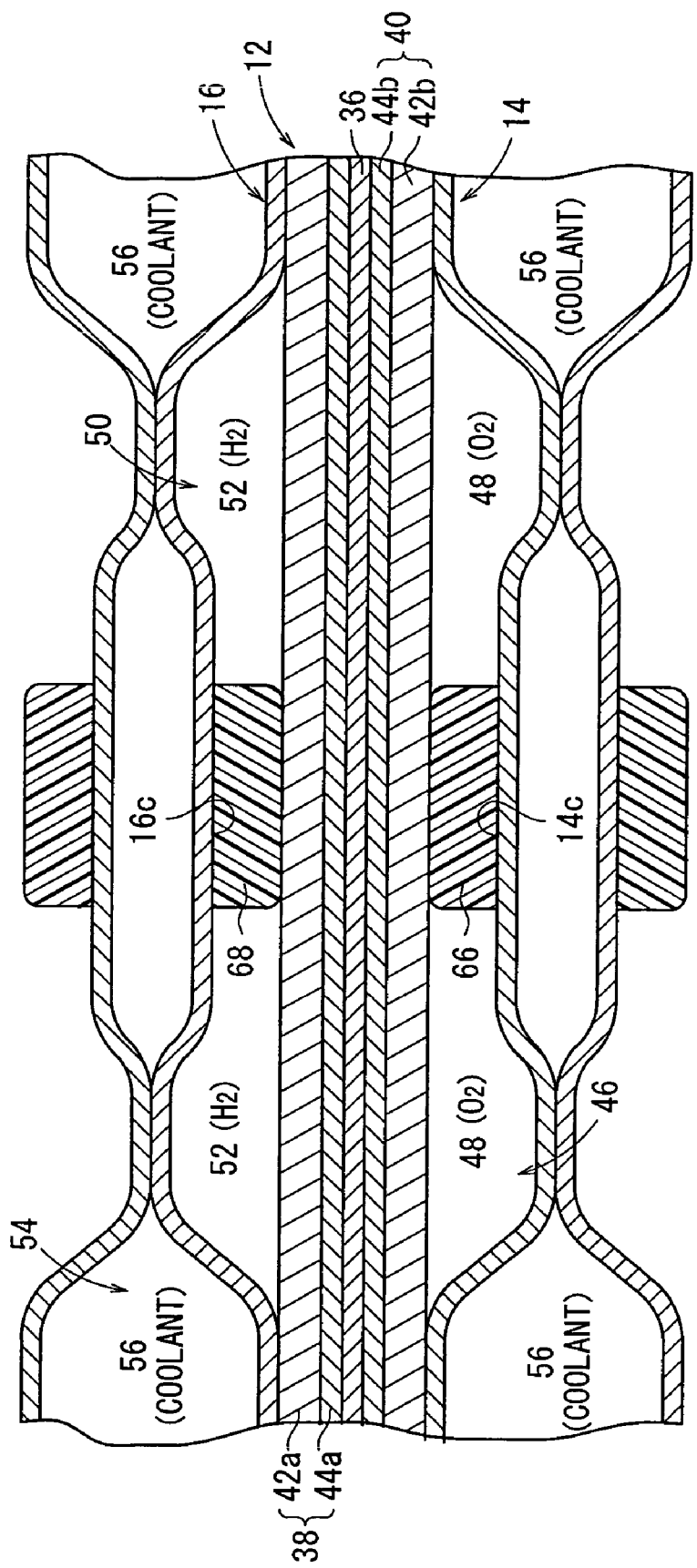
FIG. 5 is a cross sectional view showing a U-turn region of the fuel cell.
Figure 6:
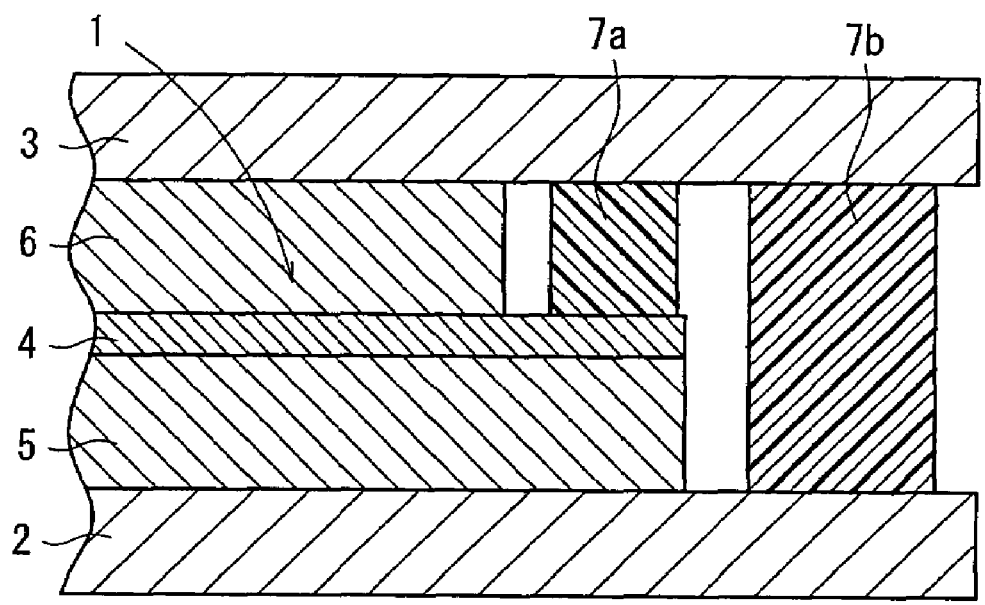
FIG. 6 is a cross sectional view showing main components of a conventional fuel cell.

As shown in FIGS. 1 and 3, the seal member 60 further includes two partition seals 66 extending integrally from the main seal 62 into the U-turn regions of the serpentine oxygen-containing gas flow passage in the oxygen-containing gas flow field 46. As shown in FIG. 5, the partition seals 66 are interposed between the gas diffusion layer 42b and the flat surface 14c of the first metal separator 14. The oxygen-containing gas flowing through the oxygen-containing gas grooves 48 along one side of the partition seal 66 turns back at an end of the partition seal 66, and flows along the other side in the opposite direction. The oxygen-containing gas grooves 48 are sealed air-tight by the seal member 60.

As shown in FIGS. 4 and 5, partition seals 68 are interposed between a flat surface 16c of the second metal separator 16 and the gas diffusion layer 42a. The partition seals 68 extend into the U-turn regions of the serpentine fuel gas flow passage in the fuel gas flow field 50. The fuel gas flowing through the fuel gas grooves 52 along one side of the partition seal 68 turns back at an end of the partition seal 68, and flows along the other side of the partition seal 68 in the opposite direction. The fuel gas grooves 52 are sealed air-tight by the seal member 60.

As shown in FIGS. 1 and 2, a seal member 70 is interposed between the first metal separator 14 and the second metal separator 16, at a position corresponding to the main seal 62 of the seal member 60. The coolant flow passage 54 is formed along the seal member 70 between the coolant supply passage 32a and the coolant discharge passage 32b. The coolant flow passage 54 is sealed air-tight by the seal member 70.

Next, operation of the fuel cell 10 will be described below. As shown in FIG. 1, a fuel gas such as a hydrogen-containing gas is supplied to the fuel gas supply passage 34a, and an oxygen-containing gas is supplied to the oxygen-containing gas supply passage 30a. Further, a coolant such as pure water, an ethylene glycol or an oil is supplied to the coolant supply passage 32a.

The oxygen-containing gas flows from the oxygen-containing gas supply passage 30a into the oxygen-containing gas flow passage 46 formed on the first metal separator 14, and flows through the oxygen-containing gas grooves 48 in the direction indicated by the arrow B in a serpentine pattern along the cathode 40 of the membrane electrode assembly 12 to induce an electrochemical reaction at the cathode 40. The fuel gas flows from the fuel gas supply passage 34a into the fuel gas flow passage 50 formed on the second metal separator 16, and flows through the fuel gas grooves 52 in the direction indicated by the arrow B in a serpentine pattern along the anode 38 of the membrane electrode assembly 12 to induce an electrochemical reaction at the anode 38.

In the membrane electrode assembly 12, the oxygen-containing gas supplied to the cathode 40, and the fuel gas supplied to the anode 38 are consumed in the electrochemical reactions at the electrode catalyst layers 44a, 44b of the cathode 40 and the anode 38 for generating electricity.

After the fuel gas is consumed at the anode 38, the fuel gas is discharged into the fuel gas discharge passage 34b, and flows in the direction indicated by the arrow A. Similarly, after the oxygen-containing gas is consumed at the cathode 40, the oxygen-containing gas is discharged into the oxygen-containing gas discharge passage 30b, and flows in the direction indicated by the arrow A.

The coolant flows from the coolant supply passage 32a into the coolant flow passage 54 between the first metal separator 14 and the second metal separator 16, and flows in the direction indicated by the arrow B. After the coolant is used for cooling the membrane electrode assembly 12, the coolant is discharged into the coolant discharge passage 32b.

In the present embodiment, as shown in FIG. 2, the surface area of the gas diffusion layer 42a is larger than the surface area of the gas diffusion layer 42b. The seal member 60 is provided on the side of the gas diffusion layer 42b. The seal member 60 includes the main seal 62 interposed between the solid polymer electrolyte membrane 36 and the flat surface 14c of the first metal separator 14, at a position corresponding to the outer marginal region 45 of the gas diffusion layer 42a. The seal member 60 further includes the flow field wall 64 extending integrally from the main seal 62 for defining a part of the oxygen-containing gas groove 48. The flow field wall 64 is inserted between the outer region of the gas diffusion layer 42b and the flat surface 14c of the first metal separator 14.

As described above, the seal member 60 is in contact with the solid polymer electrolyte membrane 36 and the outer region of the gas diffusion layer 42b. Since the contact area extends continuously from the solid polymer electrolyte membrane 36 to the gas diffusion layer 42b, the leakage of the oxygen-containing gas from the gas diffusion layer 42b is reliably prevented.

The seal member 60 itself forms a part of the oxygen-containing gas groove 48. Therefore, the space which is not utilized for power generation is not formed between the seal member 60 and the first metal separator 14. Since the oxygen-containing gas does not flow into the space which is not utilized for power generation, the oxygen-containing gas can be used efficiently. Thus, the power generation performance of the fuel cell 10 is greatly improved.

In the first metal separator 14, the power generation area (the area of the fuel cell actually utilized for power generation) is expanded to the position where the flow field wall 64 of the seal member 60 is provided. In contrast to the conventional structure, the area which is not utilized for power generation is small. Thus, the desired power generation performance of the fuel cell 10 can be maintained, and the overall size and weight of the fuel cell 10 can be reduced effectively.

As shown in FIGS. 1 and 5, the seal member 60 includes the partition seal 66 for forming the U-turn region of the oxygen-containing gas flow passage 46. The oxygen-containing gas flowing through the oxygen-containing gas grooves 48 along one side of the partition seal 66 turns back at an end of the partition seal 66, and flows along the other side in the opposite direction. The oxygen-containing gas grooves 48 are sealed air-tight by the seal member 60.

Therefore, in the U-turn region in which a pressure difference in the opposite flows of the oxygen-containing gas may exist, the partition seal 66 divides the opposite flows of the oxygen-containing gas. Therefore, shortcuts of the oxygen-containing gas are effectively prevented. Thus, the oxygen-containing gas is supplied to the entire power generation surface uniformly, and the power generation performance of the fuel cell 10 is maintained desirably.

Similarly, the partition seal 68 in the fuel gas passage 50 divides the opposite flows of the fuel gas. The partition seal 68 prevents the shortcuts of the fuel gas between the opposite flows of the fuel gas effectively. Thus, the fuel gas is supplied to the entire power generation surface uniformly.

In the fuel cell according to the present invention, a seal member is interposed between an outer marginal region of one gas diffusion layer and a metal separator. The seal member includes a flow field wall inserted between an outer region of the other gas diffusion layer and the metal separator. The flow field wall defines a part of the reactant gas flow field. The seal member is in contact with an electrolyte and the gas diffusion layer. Since the contact area extends continuously from the electrolyte to the gas diffusion layer, the leakage of the reactant gas from the gas diffusion layer is reliably prevented.

The seal member itself forms the reactant gas flow field. Therefore, the space which is not utilized for power generation is not formed between the seal member and the metal separator. Since the reactant gas does not flow into the space which is not utilized for power generation, the reactant gas can be used efficiently. Thus, the power generation performance of the fuel cell is greatly improved.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell comprising:
an electrolyte electrode assembly including a pair of electrodes and an electrolyte interposed between said electrodes, said electrodes including respective gas diffusion layers and respective electrode catalyst layers facing said electrolyte, a surface area of one of said gas diffusion layers being larger than a surface area of the other of said gas diffusion layers, said one gas diffusion layer including an outer marginal region extending outwardly beyond an outer region of said other gas diffusion layer;
first and second metal separators for sandwiching said electrolyte electrode assembly, said first and second metal separators having respective reactant gas flow fields for supplying reactant gases to said electrodes, said first separator having a plurality of first inner surfaces contacting a cathode of said electrolyte electrode assembly, a plurality of second surfaces forming a portion of a coolant flow passage and a third substantially flat outermost peripheral surface offset from the cathode in a stacking direction of the fuel cell by a distance and extending outwardly from an outermost one of a reactant gas flow field beyond an outer region of the cathode; and
a seal member having a main seal with an outer boundary wholly interposed between and contacting said first metal separator and said electrolyte, and an inner portion interposed between and contacting the third surface of the first metal separator and a planar portion of the other gas diffusion layer,
wherein said inner portion of the seal member includes a flow field wall having a height substantially equal to the distance between the cathode and the third substantially flat outermost peripheral surface of the first separator to provide an air-tight seal therebetween, said flow field wall defining one portion of power generation areas of said electrodes,
wherein a side of said flow field wall, said outer region of said other gas diffusion layer, and a portion of the third surface of said first metal separator define an outermost one of said reactant gas flow fields.

2. A fuel cell according to claim 1, wherein
said main seal is interposed between said electrolyte and said third surface; and
said flow field wall is interposed between said outer region of said other gas diffusion layer and said third surface.

3. A fuel cell according to claim 1, wherein said reactant gas flow field is a serpentine flow passage having at least one turn region;
said seal member further includes a partition seal in contact with said first metal separator and said other gas diffusion layer, said partition seal extending into said turn region of said reactant gas flow field to form said serpentine flow passage, said serpentine flow passage comprising grooves sealed air-tight; and
said reactant gas flows through said grooves along both sides of said partition seal in opposite directions.

4. A fuel cell according to claim 3, wherein
said partition seal is interposed between said electrode and said third surface.

* * * * *